Oct. 5, 1926.

M. SPITZGLASS

FLOW METER

Filed Oct. 9, 1919 3 Sheets-Sheet 1

1,601,743

Oct. 5, 1926.

J. M. SPITZGLASS

FLOW METER

Filed Oct. 9, 1919    3 Sheets-Sheet 2

1,601,743

Inventor
Jacob M. Spitzglass
Brown Nissen
Attys.

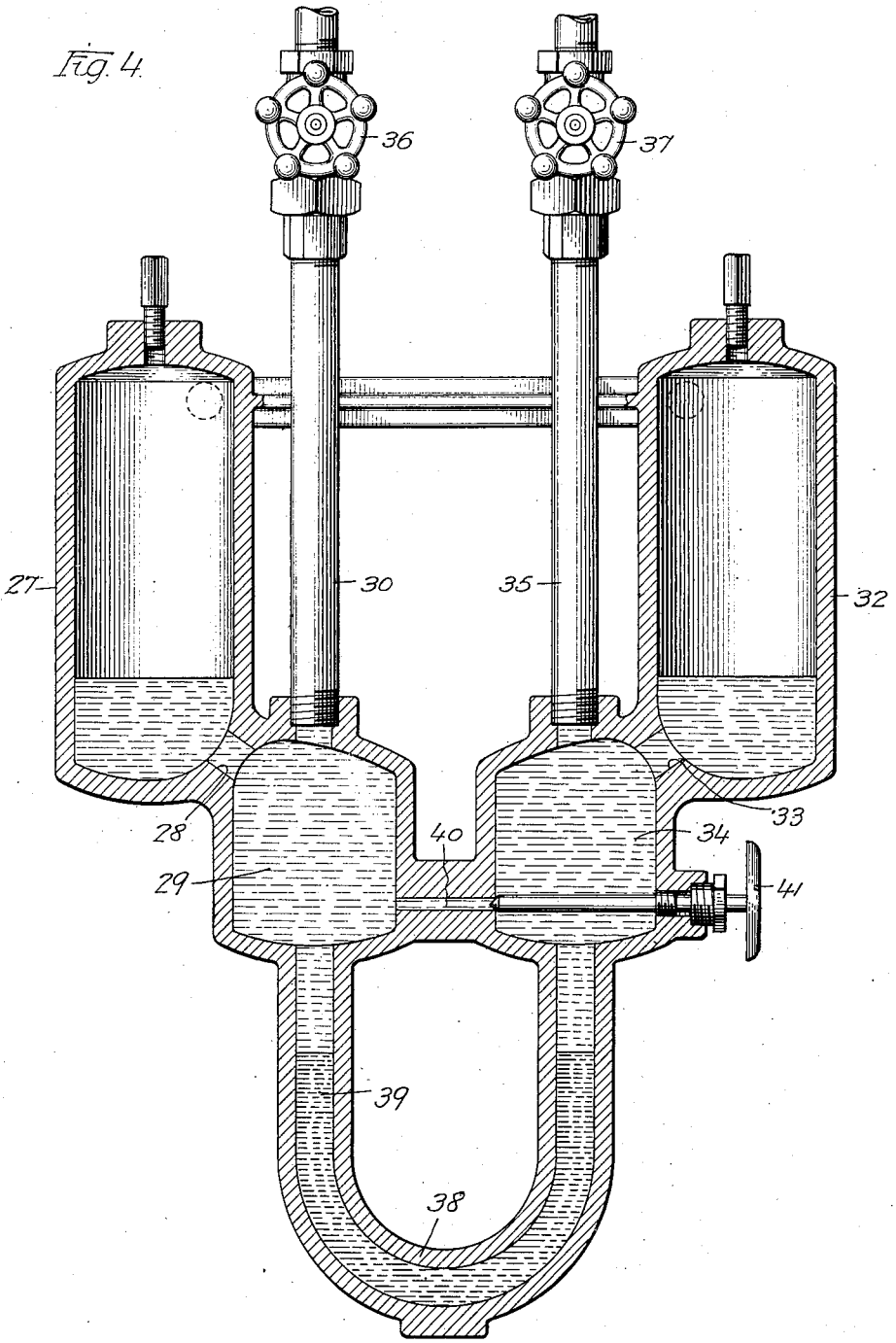

Patented Oct. 5, 1926.

1,601,743

UNITED STATES PATENT OFFICE.

JACOB M. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS.

FLOW METER.

Application filed October 9, 1919. Serial No. 329,421.

This invention has for its object the provision of meters for measuring the flow of fluids, which shall be of improved construction and operation.

The invention is exemplified in the combination and arrangement of parts shown in the accompanying drawings and described in the following specification, and it is more particularly pointed out in the appended claims.

In the drawings—

Fig. 4 is a vertical sectional view on line 4—4 of Fig. 2.

Figure 1:
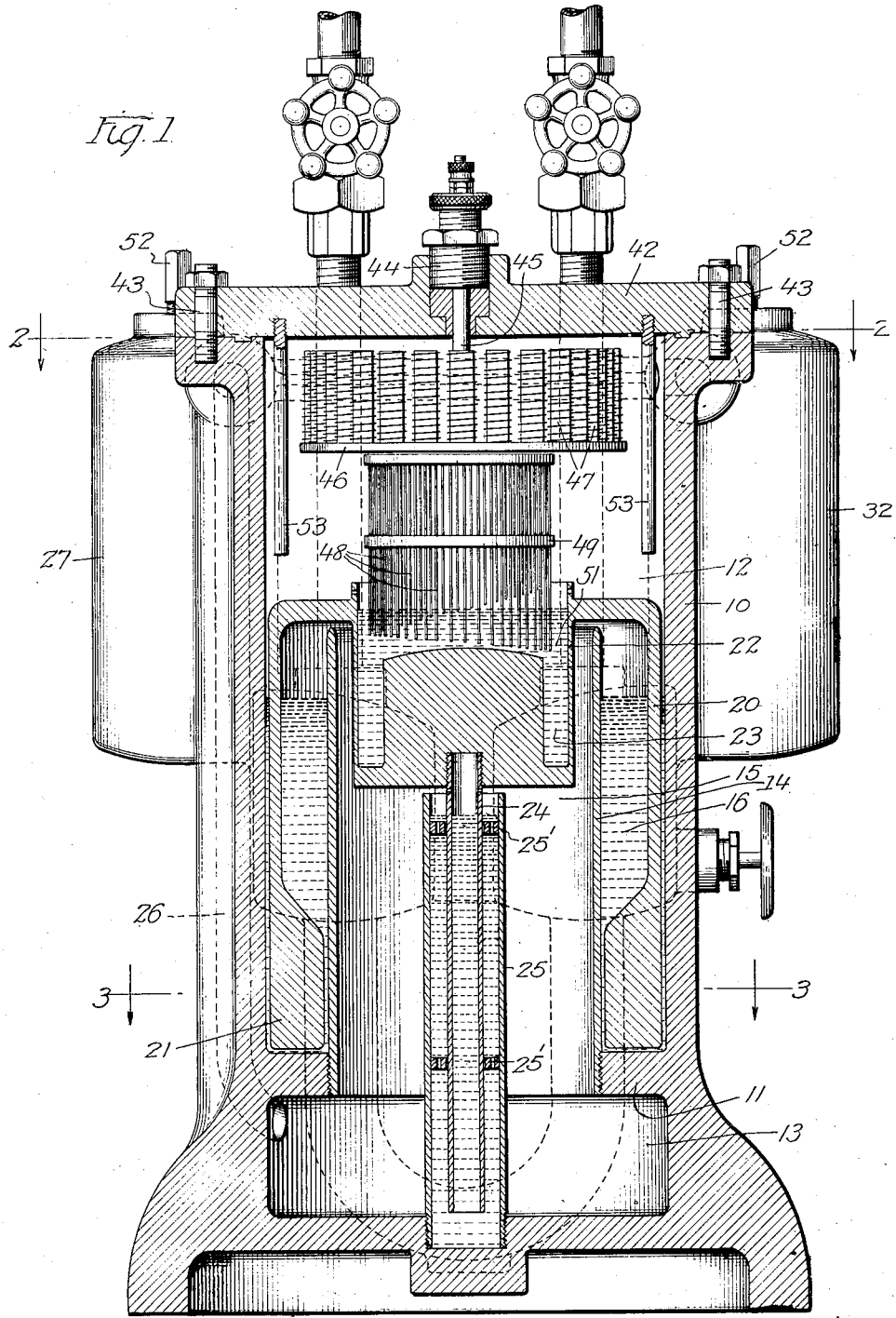
Fig. 1 is a vertical sectional view of a meter involving one form of the present invention.

The meter as shown in the drawings comprises a hollow tubular casing 10 provided with a horizontal section wall 11, which divides the interior of the casing into an upper chamber 12 and a lower chamber 13. A tubular shell 14 has its lower end threaded into a central opening in the partition 11 and divides the lower portion of the chamber 12 into a central well 15 and an exterior annular well 16. The annular well 16 is partially filled with a liquid, such as mercury, which supports a bell-shaped float 20, the sides of which extend into the well 16 and are provided at their lower edges with an enlarged rim 21. The sides of the rim 21 are spaced slightly from the walls of the annular well 16 to permit of vertical movement of the float in the well. The float 20 carries at its upper end a cup-shaped member 22 provided with an annular chamber 23. A guide rod 24 is connected with the lower face of the cup 22 and extends into a tubular member 25 which is secured to the bottom of the chamber 13 and extends upwardly therefrom. The tubular member 25 is provided with guiding contacts 25' for the rod 24 and is preferably filled with a light oil to facilitate movement of the rod 24 which acts as a guide for vertical movement of the float 20 and the cup 22 carried thereby.

Figure 2:
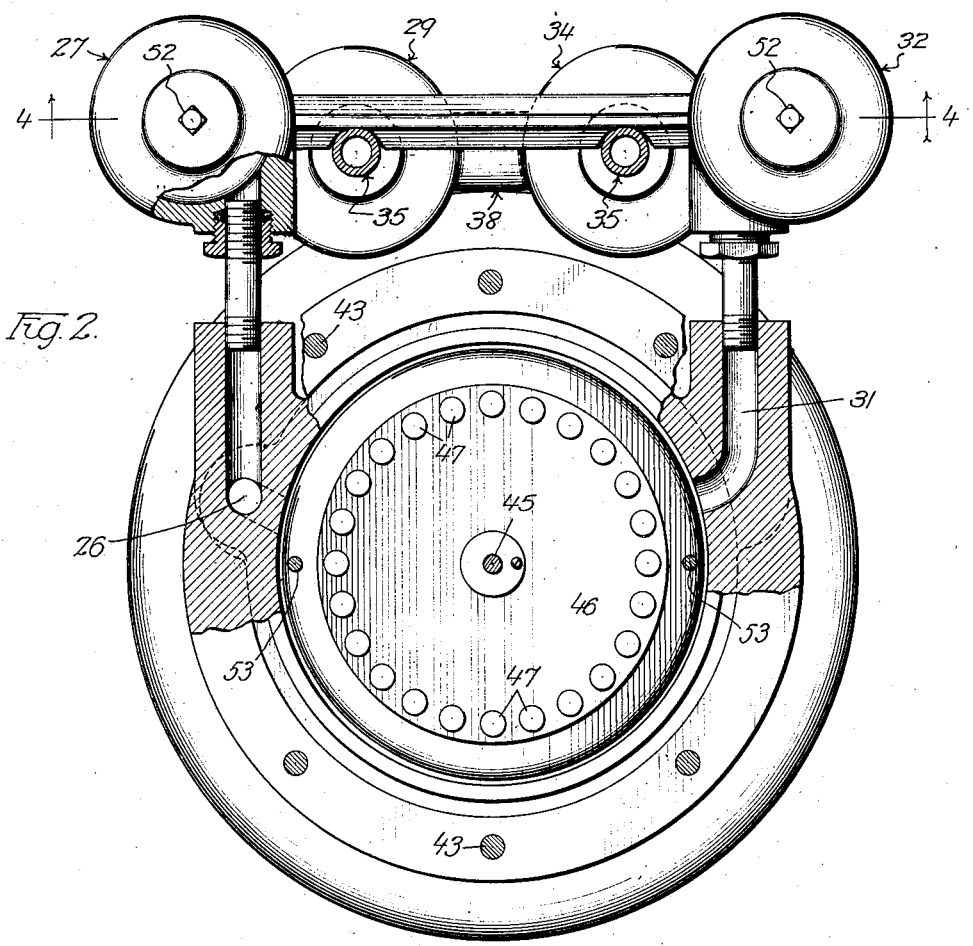
Fig. 2 is a horizontal sectional view on line 2—2 of Fig. 1, with parts broken away.
Figure 3:
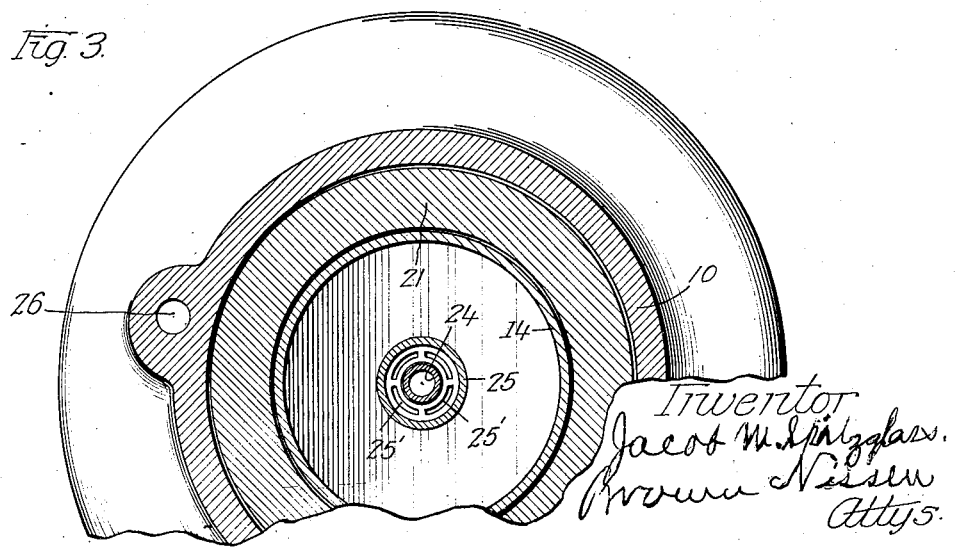
Fig. 3 is a fragmentary horizontal sectional view on line 3—3 of Fig. 1.

The upper surface of the mercury in the well 16 on the interior side of the bell 20 will be subjected to the pressure of the chamber 13 which has communication with the interior of the bell 20 through the space between the upper edge of the tube 14 and the top of the bell 20. The upper surface of the mercury within the well 16 on the exterior side of the bell 20 will be subjected to the pressure of the chamber 12. The chamber 13 is the dynamic chamber of the meter and is connected by a passage 26, shown in broken lines in Fig. 1, with the upper end of a cylinder 27. The cylinder 27 in turn is connected by a passage 28 with a chamber 29 which has a pipe 30 communicating with the upper portion thereof. The static chamber 12 is connected through a passage 31, Fig. 2, with the upper end of a cylinder 32 communicating by a passage 33 with a chamber 34. A pipe 35 enters the upper portion of the chamber 34 and the dynamic pipe 30 and static pipe 35 are connected with a source of differential pressure, such as a Pitot tube, not shown. The pipes 30, 35 may be provided with valves 36, 37, respectively. The lower portions of chambers 29 and 34 are connected by a U-tube 38, partially filled with mercury 39 or other liquid, for forming a seal between the two chambers. A bypass 40 closed by a valve 41 also connects the chambers 29 and 34.

The upper end of the tubular casing 10 is closed by the cover 42, held in place by studs 43. The cover 42 is provided with a central opening closed by a plug 44, which carries electrical connections into the chamber 12 and which supports a rod 45 by which a disc platform 46 is sustained within the chamber 12. The platform 46 carries a plurality of resistance coils 47 which are connected in series and which have their terminal carried out through the plug 44. The circuit including the coils 47 is tapped out at points between each pair of coils and connected with one of a plurality of conductor wires 48, which extend downwardly from the platform 46 and which are arranged in cylindrical formation. The wires 48 are insulated from one another except for their connection with the circuit including the resistance coils 47 and are held in proper position by a band or hook 49. The wires 48 are graded in length so that their lower ends terminate in a helical line which registers with the opening 23 in the cup 22. This opening 23 is filled with a liquid 51, such as mercury, which is a conductor of electricity and the lower ends of the wires 48 will be successively immersed in this liquid as the float 20 is raised. It will be apparent that a resistance coil 47 between two conductors 48 which have their lower ends immersed in the mercury 51 will be short-circuited and that the total resistance of the circuit including the coils 47 will be gradually reduced as the number of coils so short-circuited by elevation of the float 20 is increased.

The height of the float 20 will depend upon the difference in pressure in the chambers 12 and 13. When there is no difference in pressure between these two chambers, the buoyancy of the liquid in the well 16 is made to maintain the float 20 at the position shown in the drawings, or the float is made to sink until the amount of mercury displaced is equal in weight to the total weight of the float. As the pressure increases in the chamber 13 the differential pressure of the two chambers will raise the float from the mercury in the well 16 which will acquire a new balanced condition in which the buoyancy of the liquid and the force exerted by the differential pressure will be equalized by the weight of the float. It will be apparent that the greater the differential pressure the higher will the float be lifted. The parts may be so proportioned that any desired amount of movement can be obtained for a given pressure difference and the movement may therefore be made much greater than would result from a simple U-tube arrangement in which the difference in pressure is balanced by a difference in the height of the liquid in the two arms of the U. The instrument is therefore especially adapted for measuring the flow of fluids which move comparatively slowly and for fluids of light density so as to give low differential pressures. The resistance coils 17 are so wound that when subjected to uniform electromotive force a current will flow in the circuit directly proportional to the differential pressure between the chambers 12 and 13, and the circuit may be provided with an ammeter which will therefore indicate this differential pressure. An integrating Watt meter may also be included in the circuit for providing a record from which the total amount of flow may be ascertained. One suitable circuit arrangement is shown in my prior Patent No. 1,325,763, granted December 23, 1919.

The U-tube 38 is made shorter than the depth of liquid in the annular well 16 so that in case of a sudden surge in the pressure between the pipes 30 and 35 the mercury will be blown from the U-tube 38 permitting equalization of pressure between the two tubes before a similar effect is produced within the annular well 16. This arrangement protects the instrument from being rendered ineffective by surges in pressure in a manner similar to a safety fuse in an electric circuit with the difference however that the mercury in the U-tube 38 automatically returns to place in the U-tube after the excessive pressure has disappeared so that the instrument is again ready for operation without any attention on the part of an operator. The valve 41 provides means for equalizing the pressure between the static and dynamic chambers of the instrument at any time that it is desired to take a zero reading.

For an instrument of this kind where it is used for measuring the flow of a condensing fluid, such as steam, the liquid of condensation will accumulate in the chambers 29 and 34 above the mercury in the U-tube 38 and may extend into the lower part of the cylinders 27 and 32. The upper portions of these cylinders and their communicating passages with the chambers 12 and 13, together with the chambers 12 and 13, and the spaces connected with these chambers above the surface of the liquid in the annular well 16 are all preferably filled with a light non-conducting oil to prevent water vapor from coming into contact with the electrical conductors so that these conductors are kept properly insulated from one another and to transmit the pressure from the pipes 30 and 35 to the surface of the liquid in the annular well 16. Plugs 52 may be provided in the upper ends of the cylinders 27 and 32 for inserting additional oil into the instrument and downwardly extending rods 53 are supported upon the lower surface of the cover 42 to provide limit stops for the upward movement of the float 20.

I claim:—

1. Means for registering the quantity of fluid flowing in a conduit the flow of which fluid produces relatively slight differential pressures, said means comprising a vessel having liquid therein, a hollow float supported by said liquid and having the bottom thereof open and having relatively thin walls adjacent the surface line of said liquid so that vertical movement of said float produces but slight changes in the buoyant force exerted by said liquid on said float, means for subjecting the interior and exterior of said float to the differential pressure produced by a flow of fluid in said conduit, a cup carried by said float and having an electricity conducting liquid therein, stationary electric resistance elements and conductors of different lengths connected with said resistance elements and arranged to progressively engage the liquid supported by said float as the position of said float is varied by said differential pressure.

2. Means for registering the quantity of fluid flowing in a conduit the flow of which produces slight differential pressure, said registering means comprising a liquid supported float the portion of which adjacent the surface level of the supporting liquid has relatively small displacement so that the buoyant force of the liquid on said float is changed but slightly by normal vertical movements of said float, an electric circuit having resistance elements therein and taps connected thereto extending toward said float, a conducting liquid supported by said float for engaging said taps to short circuit portions of said resistance depending upon the vertical position of said float, said float being mechanically disconnected from the electric resistance and taps connected thereto, the arrangement being such that the variations in the resistance of said circuit are effected by the movement of the float alone, thus providing electrical means for registering the movements of said float and avoiding the necessity of mechanically movable parts for registering such movements together with the friction and consequent inaccuracy incident to such movable parts.

3. A flow meter comprising an inverted cup-shaped member supported by liquid and constituting a float, means for subjecting the interior and exterior of said member to differential pressures, said float having a receptacle for a conducting liquid thereon, and an electric circuit having conductors of different lengths arranged to successively contact with a liquid in said receptacle as the position of said float is varied by the pressures to which it is subjected.

4. A flow meter comprising a housing, a tubular member disposed in said housing and open at its upper end a supporting liquid surrounding said tubular member, a bell-shaped float disposed over the open end of said tubular member and supported on said liquid, said float having a recess therein for containing a conducting liquid, an electric circuit having resistance members therein, contact members arranged to engage the liquid in said recess, and means for subjecting the interior of said tubular member and the exterior of said float to differential pressure due to fluid flow.

In testimony whereof I have signed my name to this specification on this 6th day of October A. D. 1919.

JACOB M. SPITZGLASS.